Oct. 6, 1970  JAMES E. WEBB  3,532,979
ADMINISTRATOR OF THE NATIONAL AERONAUTICS
AND SPACE ADMINISTRATION
MATCHED THERMISTORS FOR MICROWAVE POWER METERS
Filed Feb. 12, 1968  2 Sheets-Sheet 1

*INVENTORS*
CHARLES T. STELZRIED
DONALD L. MULLEN
DONALD A. OLTMANS

BY

ATTORNEYS

Oct. 6, 1970  JAMES E. WEBB  3,532,979
ADMINISTRATOR OF THE NATIONAL AERONAUTICS
AND SPACE ADMINISTRATION
MATCHED THERMISTORS FOR MICROWAVE POWER METERS
Filed Feb. 12, 1968  2 Sheets-Sheet 2

INVENTORS
CHARLES T. STELZRIED
DONALD L. MULLEN
DONALD A. OLTMANS

BY

ATTORNEYS

United States Patent Office
3,532,979
Patented Oct. 6, 1970

3,532,979
MATCHED THERMISTORS FOR MICROWAVE POWER METERS
James E. Webb, Administrator of the National Aeronautics and Space Administration, with respect to an invention of Charles T. Stelzried, La Crescenta, Donald L. Mullen, Pasadena, and Donald A. Oltmans, San Marino, Calif.
Filed Feb. 12, 1968, Ser. No. 704,668
Int. Cl. G01r 21/04; H01c 7/04
U.S. Cl. 324—95   7 Claims

ABSTRACT OF THE DISCLOSURE

A microwave power meter comprising a pair of thermistors on a mounting block, one thermistor measuring the microwave power and the other serving to compensate for temperature changes of the mounting block, wherein the compensating thermistor is effectively matched to the other by coating it with black paint to increase its heat dissipation by conduction and radiation. A fine paint mist is applied to allow an accurate coating thickness for small thermistors, by locating the thermistor between an air suction device and a paint sprayer which is located several feet away. This allows large paint droplets to fall to the ground before reaching the thermistor while the fine mist passes across the thermistor on its way to the suction device.

ORIGIN OF THE INVENTION

The invention described herein was made in the performance of work under a NASA contract and is subject to the provisions of Section 305 of the National Aeronautics and Space Act of 1958, Public Law 85–568, (72 Stat. 435; 42 U.S.C. 2457).

BACKGROUND OF THE INVENTION

Field of the invention

This invention relates to microwave power meters and, more particularly, to power meters which are compensated for ambient temperature changes.

Description of the prior art

Low level microwave power is generally measured by thermal detectors, or bolometer elements, whose change in resistance by the heating of a microwave field is measured by a resistance bridge. The bridge measures the resistance by applying a direct current or low frequency voltage across the bolometer element, the resistance of other arms of the bridge being varied until a bridge balance is achieved.

For high microwave frequencies, thermistors are generally used as the bolometer elements because of their small size. Thermistors are semiconducting beads which havea negative resistance coefficient. They are positioned to extend across the wave guide which carries the microwave signal whose power is to be measured. The thermistors are positioned at a point along the wave guide where the electric field is a maximum, to cause a maximum heating of the thermistor. This is generally accomplished by positioning a shorting element, which extends across the wave guide, at a quarter wave length behind the thermistor.

The power-measuring thermistor is generally held in a mounting block of metal which has a wave guide passage formed therein. The thermistor, which is very small for high frequency applications, is generally already mounted in a slide which can be inserted into the mounting block. The thermistor extends across a window in the slide, and when the slide is in place the window is aligned with the wave guide passage of the mounting block.

When the ambient temperature varies, the temperature of the mounting block and of the thermistor therein also varies. Such changes in thermistor temperature cannot be readily separated from those due to the microwave signals, and can lead to erroneous measurements. In order to cancel the effects of ambient temperature changes, a compensating thermistor is mounted on the same mounting block as the power measuring thermistor. The change in resistance of the compensating thermistor is, in effect, subtracted from the change in resistance of the measuring thermistor to yield a more accurate measurement.

In order to provide an accurate compensation, the compensating thermistor must have a resistance equal to that of the power measuring thermistor within a range of temperatures of the mounting block. Both thermistors are heated to temperatures above that of the mounting block by reason of the bolometer currents used to measure their resistances. The resistance of the thermistor at a given mounting block temperature depends upon two factors: the actual temperature of the thermistor element and its resistance at that temperature. The thermistor resistance at a given mounting block temperature can be changed by reducing its temperature so it is closer to that of the mounting block. This can be accomplished by increasing its dissipation of heat to the mounting block. Alternatively, compensating thermistors can be chosen which, when mounted in the block, are substantially matched to the power measuring thermistor.

Some power meter mounts utilize thermistors which are mounted on slides that are inserted into the power mounting block, to facilitate the change of thermistors. If mounts were available which were designed to receive two of such slides, one to be used for power measurement and the other for compensation, many slide combinations could be tried until two slide-mounted thermistors were found which were matched when installed in the mounting block. However, it is difficult to obtain an accurately matched pair in this way, particularly where only a limited number of such slides are available. Furthermore, such a procedure would leave many slides unmatched and therefore unusable in the power meter.

One method that has been used to enable matching employs a metal screw which can be moved near the compensating thermistor to increase the conduction of heat from it. Such a method can be used with slide-mounted thermistors or with thermistors premanently installed in the meter mounting. In this method, heat is conducted from the thermistor through a small air gap to the metal screw. When the mounting block is oriented in different directions, the slight bending of the thermistor moves it toward or away from the metal screw. This changes the air gap by a large percentage which greatly changes the heat dissipation and causes mismatch. As a result, the power meter is sensitive to orientations and is inconvenient to use. Furthermore, extremely small thermistors are required at very high microwave frequencies such as in the millimeter region, and the adjustment of a metal screw then becomes extremely difficult. A better means for matching a pair of mounted thermistors for power meter applications would be desirable.

OBJECTS AND SUMMARY OF THE INVENTION

An important object of the invention is to provide means for changing the characteristics of a mounted thermistor to match the characteristics of another mounted thermistor.

Another object of the invention is to provide a method for enabling the application of a fine coating of material to a thermistor.

Yet another object of the invention is to provide a millimeter wave power meter which is economical and accurate.

In accordance with the present invention, a pair of thermistors is provided, each of which is mounted in a slide for insertion in a microwave power meter. The two thermistors are substantially matched so that, in the absence of a microwave signal to be measured, their resistances are the same for various temperatures of the power meter mounting. This is accomplished by the use of a coating on the surface of one of the thermistors. The coating changes the effective characteristics of the coated thermistor by increasing its ability to dissipate heat energy.

The coating which is applied to one of the thermistors may be a black paint to increase the radiation of heat from the thermistor and/or a moderately good heat-conductive material to increase the conduction of heat from the thermistor. The ability of the coating to change the effective resistance vs. temperature characteristics of the thermistor is due to the fact that both thermistors are heated above the temperature of the power meter mounting by the currents used to measure their resistances. The coating allows one thermistor to undergo a smaller increase in temperature over that of the mounting than the other. This cancels the greater change in resistance which would occur if its temperature increased as much as that of the other thermistor.

The two slide-mounted thermistors are installed in a power meter mounting block. The uncoated thermistor generally serves as the power measuring thermistor which is positioned to intercept the microwave signals. The coated thermistor serves as the compensating thermistor, which does not receive the microwave signals. As mentioned above, both thermistors are heated above the temperature of the mounting block by direct current or low frequency currents from a bolometer bridge. These currents are passed through the thermistors to measure their resistances, and the same currents pass through each. The power-measuring thermistor is additionally heated by the microwave signal.

Before receiving its coating, the installed compensating thermistor may have a resistance equal to that of the power-measuring thermistor only when the power-measuring thermistor is at a lower temperature. The coating on the compensating thermistor can result in a matching of the resistances of the two thermistors when they are in the same ambient temperature. The coating will enable the compensating thermistor to dissipate heat at a greater rate, so it actually sustains a smaller temperature rise above that of the mounting block for a given bolometer current therethrough. As a result, its resistance vs. temperature characteristics for that application are effective changed.

The matching of a pair of thermistors is generally accomplished by installing them in the power meter mount and attempting to balance a bolometer bridge. If necessary, the thermistors are switched, so that the thermistor with the smaller resistance at a given temperature is in the aperture designated to receive the compensating thermistor. The compensating thermistor is designated to receive the coating. With experience, it is possible, by noting the amount of bolometer unbalance, to apply the proper amount of coating of a given material to effect the required change in characteristics for the power meter application. After the coating is applied, the slide-mounted thermistors are again installed in the power meter mount for another bolometer balance, to determine whether the proper amount of coating has been applied.

In the case of millimeter microwave, the thermistors are extremely small, on the order of a fraction of a millimeter in diameter and length. In order to regulate the coating, a very fine paint mist must be applied, and large droplets of paint must be avoided. This is accomplished by locating a suction device such as a vacuum cleaner on one side of the thermistor and applying a spray from a spraying apparatus located several feet away on the other side of the thermistor. The paint sprayer creates both large droplets and a fine mist. The large droplets fall to the ground before reaching the thermistor. The mist of fine paint particles is carried past the thermistor by reason of the movement of air toward the vacuum cleaner. The coating is applied gradually, and the thickness therefore can be easily regulated.

DESCRIPTION OF THE PREFERRED EMBODIMENTS

Figure 1:
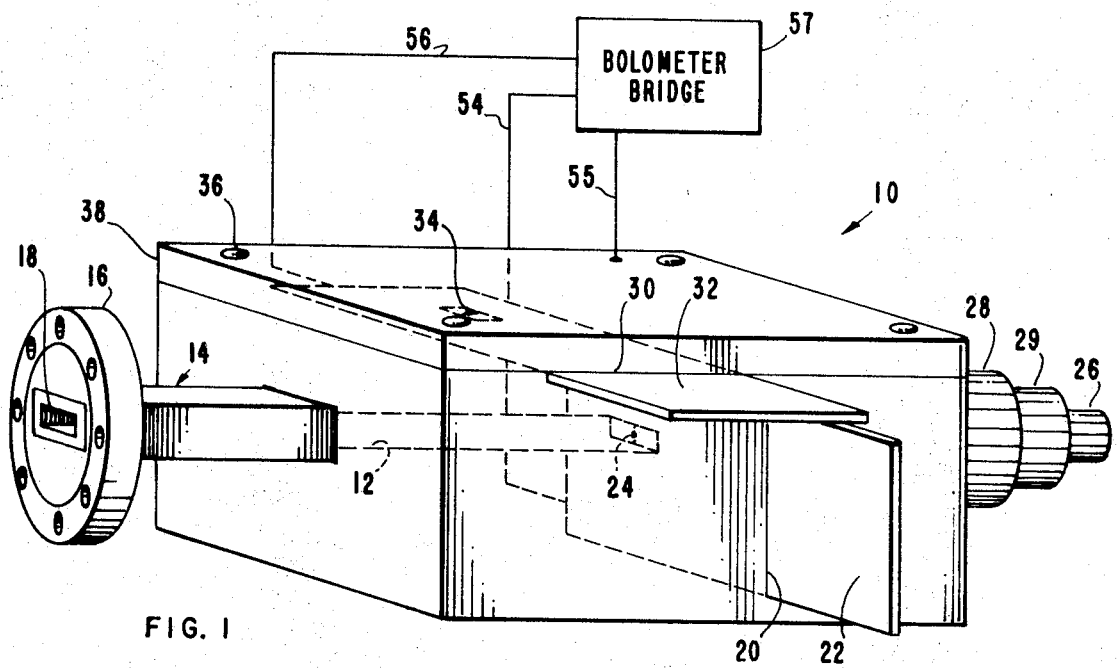
FIG. 1 is a perspective view of a power meter mount constructed in accordance with the invention.
Figure 2:
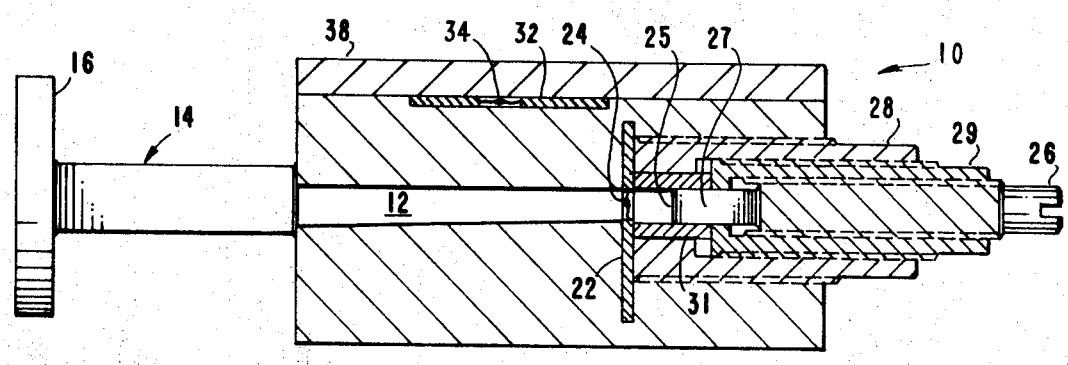
FIG. 2 is a sectional, side elevation view of the mount of FIG. 1.

FIGS. 1 and 2 illustrate a microwave power meter comprising a mounting block 10 having a passageway 12 forming a wave guide. The passageway 12 connects to a wave guide assembly 14 which carries the microwave signal whose power is to be measured. The wave guide has a flange 16 which contains holes for connection to a similar flange of a microwave source, for aligning its wave guide window 18 with that of the source.

The mounting block 10 includes a measuring slide aperture 20 for receiving a measuring slide 22 containing a measuring thermistor 24. The thermistor 24 is positioned in line with the wave guide passageway 12 so that microwaves pass by the thermistor to increase its temperature. The temperature rise is due to the passage of microwave-frequency currents through the thermistor by reason of its location at a point where the microwave electric field is a maximum. The field is a maximum a quarter wave length in front of a short circuit across the wave guide which exists at 25.

The wave guide passageway 12 extends on both sides of the thermistor position. A tuning knob 26 can be used to move a shorting conductor 27 to a position so that its forward end 25 is spaced a quarter wave length behind the thermistor 24 for the particular wave length of the signal to be measured. A clamping knob 28 allows clamping of the slide 22 in place after its insertion in the aperture 20. Another clamping knob 29 enables the movement of a small-length wave guide section 31, within which the shorting conductor 27 moves, to press the wave guide section into tight engagement with the slide. A second slide aperture 30 in the mounting block is adapted to receive a compensating slide 32 which is similar to the measuring slide 22, and which carries a compensating thermistor 34. Screws 36 which hold a top plate 38 of the mounting block can be tightened after the compensating slide 32 is in its slide aperture, to hold it firmly in place.

Figure 3:
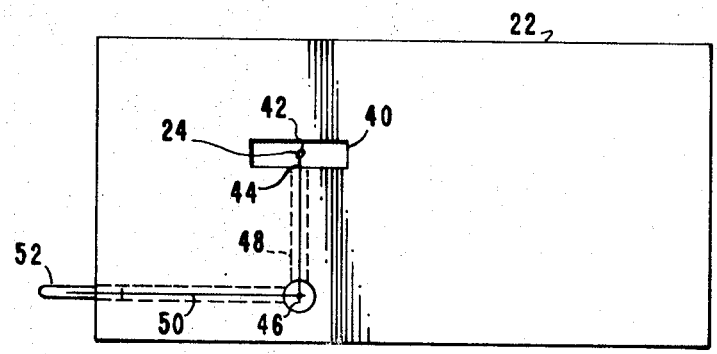
FIG. 3 is a front elevation view of a slide of the mount of FIG. 1.

FIG. 3 shows the measuring slide 22, which appears substantially identical to the compensating slide 32. The measuring slide includes a thermistor window 40 which is aligned with the wave guide passageway 12, for receiving microwave power. The thermistor 24 has one end 42 attached to the slide 22, and an opposite end 44 connected to an electrical conductor 46 which extends through an insulator 48 in the slide. The conductor 46 connects to another insulated conductor 50 which extends to a pin 52. When the slide 22 is in place, the pin 52 fits into a socket in the mounting block which is connected to a wire 54. The compensating thermistor 34 is similarly connected, with the lead of the thermistor 34 not connected to its slide being connected to a second wire 56.

The two wires 54 and 56 of the two thermistors extend to a bolometer bridge 57, and a wire 55 connected to the mounting block 10 also extends to the bridge. The bridge measures the increase in resistance of the measuring thermistor 24 due to microwave power received through the wave guide assembly 14. Changes in the power measuring thermistor due to variations in the temperature of the mounting block 10 are compensated by connecting the compensating thermistor 34 to another arm of the bolometer bridge. The resistance measurements are made by the passage of a small current through the wires 54 and 56 to the thermistors. The measuring currents raise the temperature of both thermistors above that of the mounting block. However, substantially the same current flows through each thermistor so the heating energy to them is substantially the same.

In order to allow accurate compensations for ambient temperature changes, the characteristics of the compensating thermistor 34 must be closely matched to those of the measuring thermistor 24 when both are in place on the block 10. Thermistors of the same type, and which are mounted on the same type of slide that is generally available for these purposes, display widely different characteristics. As a result, it is difficult to obtain a matched pair. If a small batch of mounted thermistors is available, a pair of thermistors which is moderately well matched can be obtained with some difficulty. The pair is obtained by testing with the bridge while both of the thermistors are in the power meter mounting. The two thermistors of a matched pair are thereafter always used together, one serving as the measuring thermistor while the other serves as the compensating thermistor. However, many pairs of thermistors may have to be tested before a moderately well matched pair is obtained, and even such selected pairs are generally not well matched. Furthermore, this leaves many thermistors in the group unmatched, and therefore unusable in the power meter of FIG. 1.

It has been found that the resistance-temperature characteristics of a thermistor can be readily changed by coating it and its leads, and particularly by using a coating of a dark color, such as black paint. This allows more heat flow from the thermistor to the slide by conduction through the portion of the coating on the thermistor leads and by radiation. The extra heat dissipation from the coated thermistor lowers its temperature, which is higher than that of the mounting block because of the bolometer currents. The lower temperature results in a change in the resistance of the coated thermistor for each temperature of the mounting block. Thus, one thermistor of a pair can be covered with a thin coating of paint or with successive coatings, until its characteristics match those of another thermistor for a given measuring current through the thermistors and for the slide and mounting block environment. In this way, all or nearly all of the thermistors in a group can be used in matched pairs.

While the coating of thermistors is simple in principle, the coatings are often difficult to apply. For millimeter wave lengths, the thermistors are extremely small. For example, in one application for microwaves in the three-millimeter region, the thermistor window 40 had dimensions of 0.13 by 0.03 inch. The thermistor was on the order of a hundredth of an inch in diameter. If ordinary spraying methods are used, large globules of paint are likely to fall on the thermistor, and the coating thickness cannot be controlled. In accordance with the present invention, apparatus of the type shown in FIG. 4 is used to effect a controlled coating.

Figure 4:
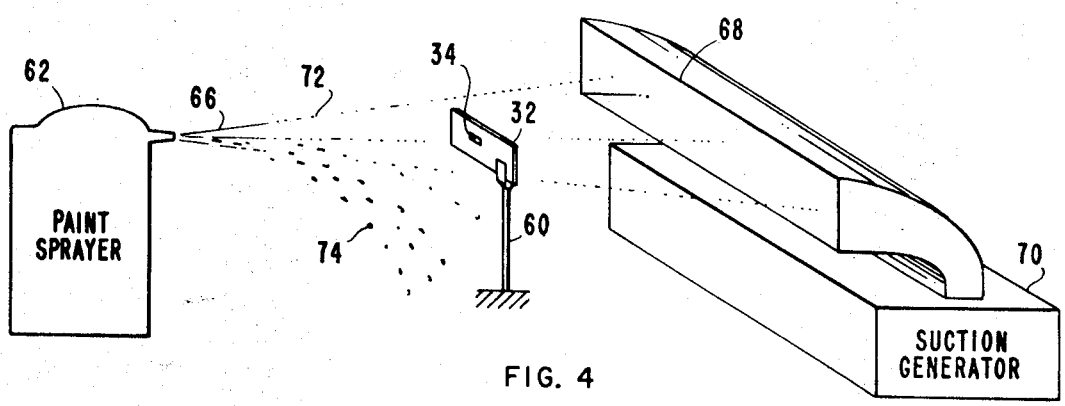
FIG. 4 is a pictorial view of a method and apparatus for applying a thin coating of paint to a thermistor on a slide.

In the apparatus of FIG. 4, a compensating slide 32 with a compensating thermistor 34 to be coated is prepared by first applying a mask. The mask may be a layer of tape or other substance which covers the entire area of the slide, except for the window through which the thermistor 34 extends. The slide 32 is then held in a clamp 60 to prepare it for spraying. A paint sprayer 62, such as a typical compressor sprayer unit or even a spray can, is used to spray paint 66 at the slide. A suction head 68 is positioned on the side of the slide opposite the paint sprayer. The head 68 is connected to a suction generator 70, which may be a vacuum cleaner.

The paint spray 66 from the sprayer includes both fine mist 72 and large globules 74. By positioning the paint sprayer 62 at a sufficient distance from the slide 32, such as several feet, the large globules 74 fall to the ground before reaching the area of the slide. The mist 72 is drawn by the suction head 68 so it moves through the aperture 34. This provides a stream of very fine paint globules, at least an order of magnitude smaller than the thermistor, to coat the thermistor. The paint sprayer 62 is operated for a sufficient time to provide a thin coating on the thermistor 34.

After the applied coating has dried, the thermistor is tested to determine whether it is now matched to another thermistor which is to be used as the measuring thermistor. The testing is accomplished by inserting the slide into the compensating slide aperture of the power meter, and balancing the bolometer bridge 57 with the power-measuring thermistor in place. If too much paint has been applied, it can be removed with a solvent and a new coating applied.

With experience, an initial testing of the thermistor 34, before any coating is applied, can be used to indicate the amount of time to operate the paint sprayer 62 so as to form a coating of the required average thickness. It should be noted that either the coated or uncoated thermistor can be used as the measuring thermistor. However, the uncoated thermistor of a matched pair is generally used to receive the microwave power because it generally has a smoother and more regular surface, and may be expected to give more consistant results. It should also be noted that a variety of coating materials can be used. While a black coating allows increased radiation of heat, even a transparent coating which appreciably increases conduction of heat through the thermistor leads can be used. Generally, more heat is dissipated by conduction than by radiation, even for black coatings. If a coating material of lower heat conductivity is used, this merely means that a larger coating must be applied. A typical paint composition suitable for a thermistor coating includes a resin such as a polyester dissolved in an aeromatic hydrocarbon such as benzene. It may also include a pigment.

Figure 5:
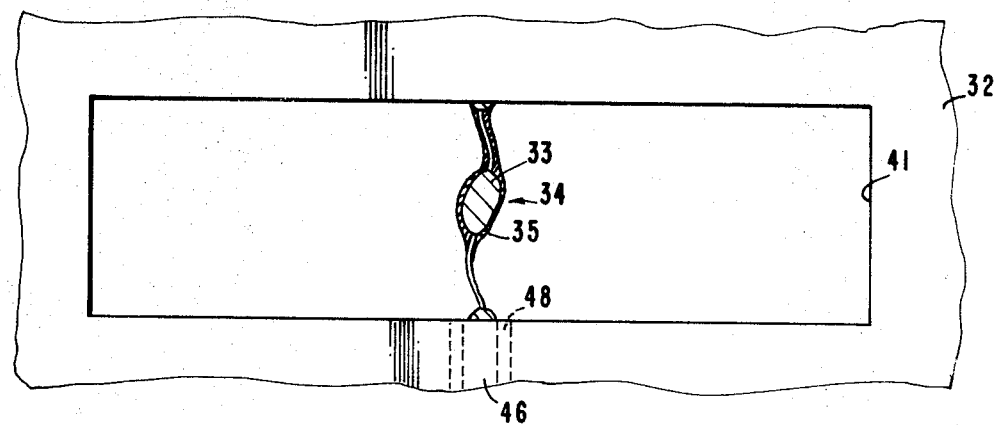
FIG. 5 is an elevation view of a portion of a compensating slide of FIG. 1, showing a coating on the compensating thermistor thereof.

FIG. 5 illustrates the coated compensating thermistor 34 which extends across a thermistor window 41 in the compensating slide 32. The main portion 33 of the thermistor includes the entire thermistor except for a coating 35 on the main portion. As can be seen, the coating is generally not regular, because of the difficulty of application. However, the average thickness of the coating can be controlled to some extent because only a fine mist of paint is used.

Figure 6:
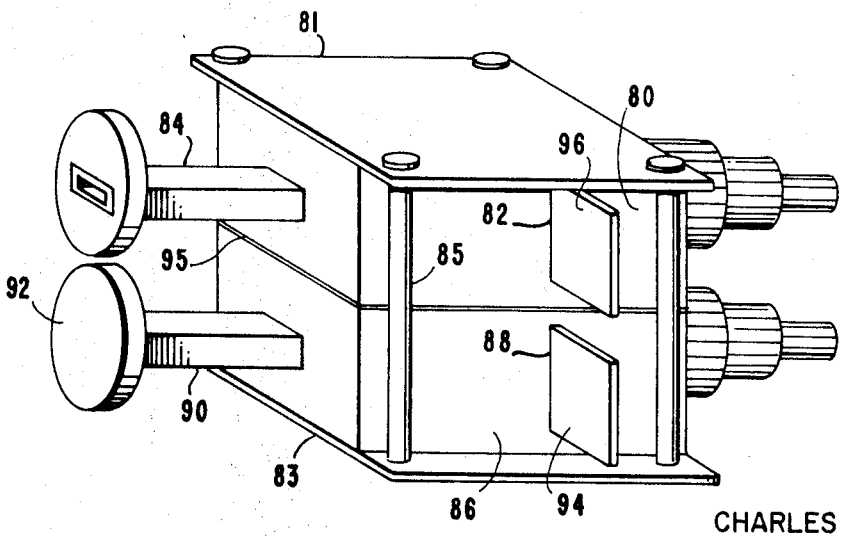
FIG. 6 is a perspective view of another form of a power meter mount constructed in accordance with the invention.

FIG. 6 illustrates another form of mounting which is useful where a special compensating mount is not available. In the mount of FIG. 6, a first block 80 and a second block 86 are clamped together by a pair of plates 81 and 83, with bolts 85 extending between them. Each block has a slide receiving aperture 82 and 88, respectively, for holding a slide-mounted thermistor. Each block, if used separately, can measure microwave power received through a wave guide 84 or 90. However, instead of using both mounting blocks to measure microwaves received through their respective wave guides, only one of them, 80, is so used. The other block 86 has its wave guide 90 closed by a cover 92. Accordingly, the thermistor which is held in a slide 94 extending into its slide aperture 88 is used merely for compensation purposes, in the manner described above for the mount of FIG. 1.

In order to keep both thermistors in the mounting of FIG. 6 at the same temperature, the two blocks 80 and 86 are held together by a heat conducting layer 95 such as a silicon grease. A slide 96 extending into the aperture 82 of the first block contains a measuring thermistor. The outputs of the two thermistors aer used in the same way as the thermistors of FIG. 1. The same set of slides used in the embodiment of FIG. 1 can be used in the embodiment of FIG. 6, and the same method for matching the thermistor pairs is used for both power mounts.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:
1. A microwave power meter comprising:
mounting block means;
first power detector means mounted on said mounting block means, said power detector means including a main portion of predetermined physical construction having a resistance which varies in accordance with the temperature of said mounting block means;
second power detector means mounted on said mounting block means, said second power detector means having a main portion substantially indentical in physical construction to the main portion of said first power detector means but of appreciably different resistance within a predetermined temperature range of said mounting block means, said main portion of said second power detector means having a coating thereon;
wave guide passageway means defined in said mounting block means for carrying a microwave signal to one of said power detector means; and
means for carrying currents to said first and second power detector means to measure their resistances;
said coating on said main portion of said second power detector means being of a material for removing heat, and which is in an amount that changes the resistance characteristics of the entire second power detector means to substantially match those of said first power detector means in the absence of a microwave signal in said passageway means, within said predetermined temperature range of said mounting block means.

2. A microwave power meter as defined in claim 1 wherein:
said coating on said main portion of said second power detector means has substantially different radiation characteristics than the surface of said main portion.

3. A microwave power meter as defined in claim 1 wherein:
said coating on said main portion of said second power detector means is a material of appreciable heat conductivity.

4. A microwave power meter as defined in claim 1 wherein:
said mounting block means includes a pair of slide apertures for receiving slides; and
each of said power detector means comprises a slide for insertion in one of said slide apertures, said slide having a window, and said main portion of said power detector means comprises a thermistor extending substantially across said window.

5. A microwave power meter as defined in claim 4 wherein:
said thermistor of each of said power detector means comprises a bead of thermistor material positioned at approximately the center of said window and a pair of leads extending between said bead and opposite walls of said window; and
said coating on said main portion of said second power detector means is disposed on at least one of said leads of said bead of thermistor material thereof, whereby to increase heat conduction to said slide.

6. A power meter mount for a microwave power meter that measures microwaves having a wave length on the order of millimeters comprising:
mounting block means having a pair of slide apertures for receiving slides, and walls forming a wave guide for carrying microwaves to only one of said slides;
a pair of slides disposed in said block means, each having a thermistor mounted thereon; and
means for carrying currents to said thermistors;
both of said thermistors having a main portion of substantially identical physical construction, and a first of said thermistors having a coating on its main portion of material of appreciable heat conductivity, said coating being in an amount that changes the resistance of said first thermistor over at least a predetermined temperature range of said mounting block means to substantially match the resistance of a second of said thermistors.

7. A power meter mount as defined in claim 6 wherein:
said second of said thermistors is positioned in line with said walls forming a wave guide, to enable receipt of microwave signals; and
said coating on said first of said thermistors is of a material which has appreciably different heat radiation characteristics than the surface of said main portion.

References Cited
UNITED STATES PATENTS

| | | | |
|---|---|---|---|
| 3,237,101 | 2/1966 | Vaughan | 324—95 |
| 3,345,561 | 10/1967 | Martin | 324—95 |
| 3,421,081 | 1/1969 | Schneider | 324—95 |

RUDOLPH V. ROLINEC, Primary Examiner

E. F. KARLSEN, Assistant Examiner

U.S. Cl. X.R.

338—23